Milo M. Kensrue,
INVENTOR.

WHANN & McMANIGAL
Attorneys for Applicant
by Robert M. McManigal

Feb. 21, 1967  M. M. KENSRUE  3,305,664
WELDING APPARATUS
Filed March 18, 1965  2 Sheets-Sheet 2
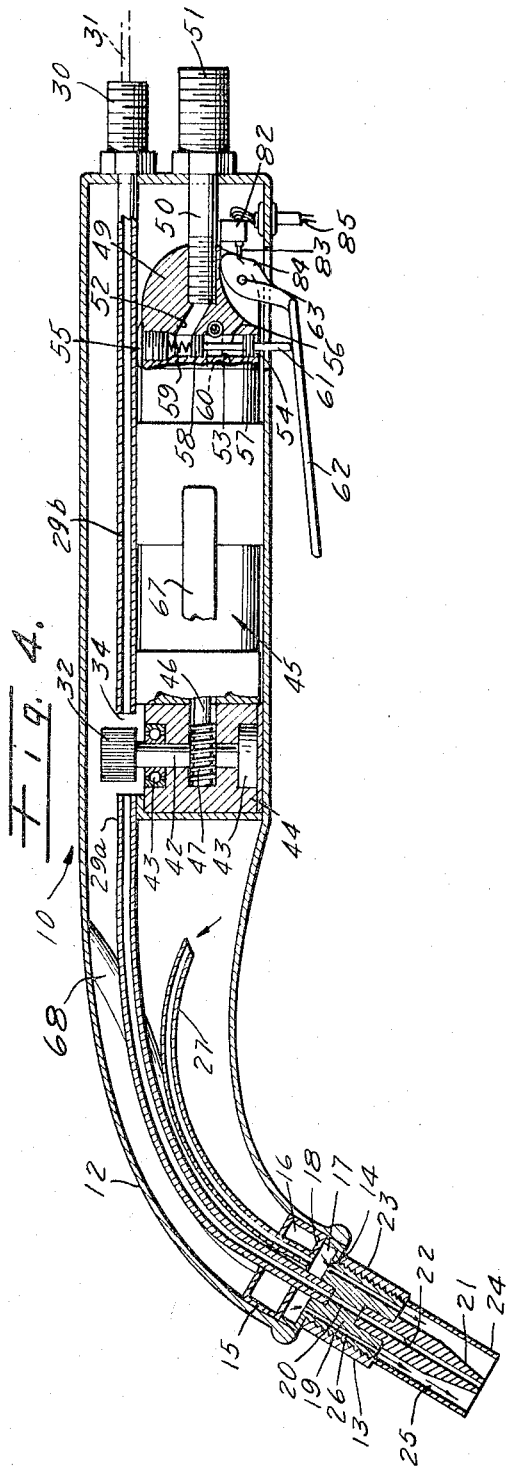
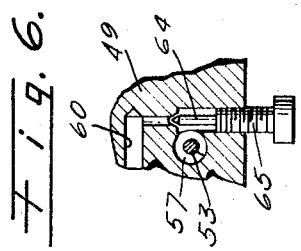
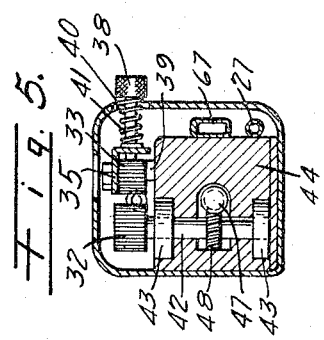
Milo M. Kensrue,
INVENTOR.
WHANN & McMANIGAL
Attorneys for Applicant
by Robert M. McManigal 3,305,664
WELDING APPARATUS
Milo M. Kensrue, 13882 Sanderstead Road,
Santa Ana, Calif. 92705
Filed Mar. 18, 1965, Ser. No. 440,897
12 Claims. (Cl. 219—130)

The present invention relates generally to welding apparatus and components thereof; and is more particularly concerned with apparatus having principal use in gas shielded electric arc welding utilizing a fusible wire electrode.

In its broad concepts, the present invention has for an object the provision of an improved welding gun or welding torch of the type wherein an electrode welding wire is fed by fluid powered mechanism, which is of a compact size; which is so shaped as to permit easy handling by the welder without having to assume an unnatural position; and which incorporates a unique arrangement of easily accessible controls for coordinating and combining the various welding procedures in a manner which will assure the best possible weld.

Conventional welding guns of the type utilized in gas shielded arc welding for feeding the fusible wire electrode have heretofore embodied a configuration in which the "hand-grip" of the gun was at right angles to the "barrel" through which the electrode wire is fed to the nozzle welding tip. Such design lacks the simplicity, flexibility and ease of control such as was heretofore possible in conventional torches as utilized with oxyacetylene welding. Accordingly it is a further object of the present invention to provide an improved torch construction which embodies the mechanism of the conventional welding gun, yet conforms in general to the shape and configuration of the gas welding torch.

A further object of my invention is to provide in a hand held arc welding torch a unique construction whereby the exhaust from the fluid power motor that drives the wire feeding mechanism may be utilized to move the welding fumes in a direction away from the welder in order that he will not have to breathe these fumes into his lungs. Such fumes cause some welders to become quite ill, and constitute a health hazard. By moving the welding fumes away from the welder, the welder will not have to breathe these into his system.

Another object of the invention is to provide arc welding apparatus in which the air or other driving gas fluid for the motor which feeds the wire electrode at the gun or torch may be cut off and and turned on simultaneously both at the torch as well as at a remote source of supply. In my copending application, Serial No. 333,529, filed December 26, 1963, now Patent No. 3,253,116 dated May 24, 1966, wherein starting and stopping of the motor is controlled by means of a valve placed at the source of supply, there is a sufficient amount of pressurized fluid left in the supply conduit to briefly operate the motor after the supply has been cut off. This brief operation causes a further feed of a few inches of electrode wire which must be removed before the welder can again continue after the feed has been stopped. This not only is time consuming but is costly and wasteful. By simultaneously valving the supply at the source and delivery ends of the supply conduit for the motor operating fluid, or by providing a valve at the source which will quickly exhaust the fluid from the supply conduit at cutoff, the objectionable over-travel is effectively prevented.

Still another object is to provide on the torch manually operable control for varying the flow of operating fluid gas to the motor of the wire advancing mechanism, whereby the speed of wire feed is at all times under the control of the welder and may be increased and decreased by a simple trigger control. With this arrangement, the torch of the present invention, when utilized with a constant voltage welder, provides instantaneous amperage and concomitant heat control by controlling the speed of the wire electrode. Variations of the order of 50 amperes are readily obtainable in this manner.

It is also an object of the present invention to provide means whereby the efficiency of the welding operation and cooling of the torch may be augmented by precooling of the air supply to the air motor. This may be accomplished by the provision of a heat exchanger at the remote control unit, or the equivalent may be accomplished by constructing the supply conduit in such a manner that it will cool the air during transit from the source of supply to the torch.

Further objects of the invention will be brought out in the following part of the specification, wherein detailed description is for the purpose of fully disclosing the invention without placing limitations thereon.

Referring to the accompanying drawings, which are for illustrative purposes only:

FIG. 4 is an enlarged longitudinal sectional view through the entire welding torch, certain portions being shown in full lines and other details in section;

FIG. 5 is a transverse section taken substantially on line 5—5 of FIG. 2; and

FIG. 6 is a detailed fragmentary sectional view taken substantially on line 6—6 of FIG. 2.

Figure 1:
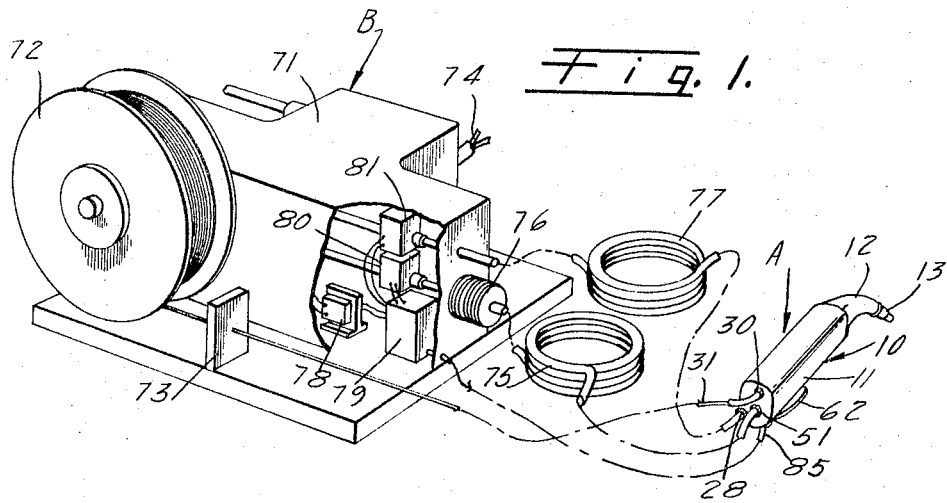
FIG. 1 is a perspective view of arc welding apparatus embodying the features of the present invention.

Referring more specifically to the drawings, the apparatus, as shown in FIG. 1, primarily comprises a welding torch A for manual manipulation at the work by the welder. This torch is operatively connected and associated with a remote operating and control unit B which may or may not comprise a part of a welding machine.

The welding torch of the present invention will be seen to differ in its shape and configuration from the usual conventional welding gun in which the handle-grip is at right angles to the barrel portion of the gun. The welding torch of my invention conforms more generally to the shape and design of torches as heretofore utilized in oxyacetylene welding and comprises an elongate housing structure 10 of generally tubular construction and preferably made of a phenolic or other suitable material to provide an insulating shell within which there is housed the electrode feeding components of the apparatus. The housing structure in general constitutes an elongate straight body portion 11 which provides a hand-grip which may be gripped by the welder and used to manipulate the torch to the various positions of operation. The body portion 11 is continued at one end and formed into a neck extension portion 12 which curves away from the axis of the straight body portion and is connected at its outermost end with a welding nozzle 13 which will thus be positioned at an angle with its longitudinal axis in angular relation with respect to the axis of the straight body portion 11.

As best shown in FIG. 4, the outermost end of the neck extension 12 is fitted with a cylindrical adapter 14 having a compartmented head end 15 which is internally constructed to provide an air cooling chamber 16 and a gas receiving chamber 17, these chambers being separated by means of an internal partition wall 18. The adapter is preferably made of an appropriate metal, and the head end is secured within the neck end in any appropriate manner. The head end is integrally formed with a projecting stem 19 which is axially formed with a tubular passage 20 through which an electrode wire may be endwise fed to an axially projecting contact tip 21 having an axial bore passage 22 which forms a continuation of the passage 20.

Figure 2:
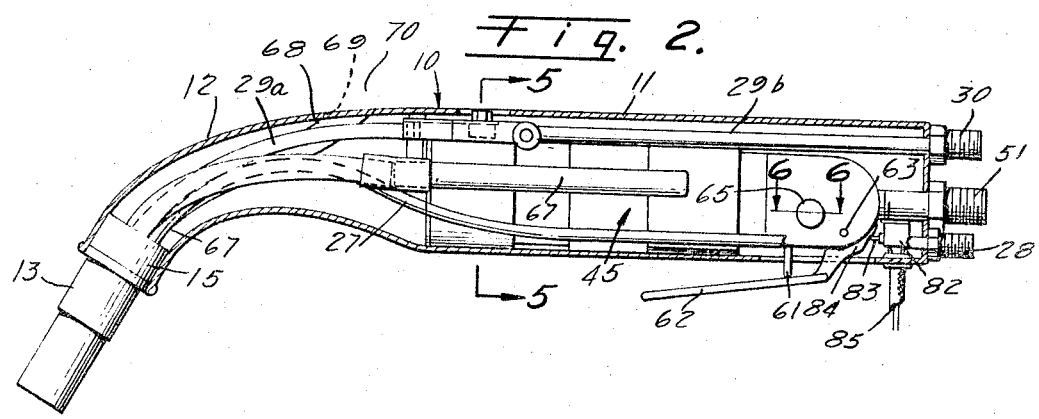
FIG. 2 is a side elevational view of a welding torch as used in such apparatus, shown partly in section, to indicate the operative relationship of the parts therein.

The stem 19 is externally threaded to receive an internally threaded coupling end 23 of the nozzle 13. Integrally formed with the coupling end 23 is a tubular extension 24 which surrounds the contact tip in spaced relation thereto so as to cooperatively form a gas receiving annular space 25 for gas which is conducted through a series of passages 26 outwardly spaced around the passage 20 of the stem and which have communication with the gas receiving chamber 17. The space 25 thus conducts the inert gas to the weld to provide the required shielding atmosphere. Gas is supplied to the chamber 17 through a conduit 27 which extends through the housing and terminates in the end opposite the neck 12 where it is provided with a suitable connection fitting 28 (FIG. 2). The passage 20 is in communication with an electrode wire guiding tube composed of cooperative sections 29a and 29b, the latter of the sections being terminated in a connection fitting 30 at the opposite end of the housing 10.

Figure 3:
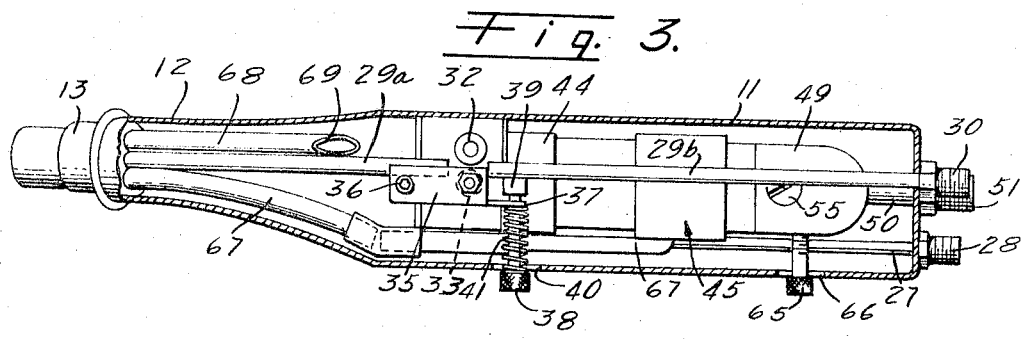
FIG. 3 is a top plan view of the same, shown partly in section to disclose the interior parts.

An electrode welding wire 31 (FIG. 1) is led into the tube section 29b from the connection fitting 30 and thence through section 29a. This wire is fed by means of cooperably associated rollers 32 and 33 which are positioned in a gap 34 between the spaced adjacent inner ends of tube sections 29a and 29b, the welding wire passing between these rollers. The rollers may have serrated peripheries so as to better engage the wire. One of these rollers, in this case roller 32 is power driven, while the other roller 33 is arranged as an adjustable idler roller. As best shown in FIGS. 3 and 5, the idler roller 33 is supported upon the outermost end of a swingable bracket member 35 supported on a pivot 36. At its free end, the bracket member 35 is provided with an extension 37 through which there extends an adjusting screw 38, the innermost end of this screw having threaded engagement in a fixed lug 39 on a part of the power driving means to be subsequently described. The outermost end of the screw 38 extends through an opening 40 of the housing so as to be externally engageable. A compression spring 41 carried by the screw and having one end engageable with the screw head, while the other end engages the extension 37, provides through the screw adjustment means for varying the tension applied to the welding wire electrode.

The power driven roller 32, as shown in FIGS. 4 and 5, is mounted on one end of a shaft 42 supported for rotation in suitable spaced bearings 43—43 on a gear housing 44 positioned at one end of a driving motor housing 45. This motor is of a type which is arranged for operation by fluid under pressure, such as air or other gas, and has an axis of rotation which is positioned in parallel relation to the longitudinal axis of the straight body portion 11 of the housing. This motor has a delivery shaft 46 upon which a worm 47 is mounted for operative engagement with a worm gear 48 carried by the shaft 42 intermediate the bearings 43—43.

At the opposite end of the motor housing 45, there is provided an end cap 49 to which there is secured an inlet conduit 50 for the motor actuating fluid, the outermost end of this conduit terminating in a connection fitting 51 which serves both as a connector for supplying fluid to the motor as well as electric power to the welding wire electrode as it passes through the torch enroute to the contact tip 21. The innermost end of the inlet conduit 50 communicates with one end of a bore passage 52, the other end of this passage communicating with a transversely extending bore passage 53 having an innermost end closed by a bottom wall 54, and at its outermost open end by a removable threaded plug 55. Thus, a valve chamber is formed within which a reciprocable valve structure 56 is mounted, the structure including a peripherally sealed head member 57 at one end in spaced relation to a peripherally sealed valve element 58 at the other end. The valve element 58 is movable from a normally closed position under the urging force of a compression spring 59 to a variable open position with respect to the junction opening of the bore passage 52 with the bore passage 53. As shown in FIG. 4, the valve element 58 functions between the inlet bore passage 52 and an outlet bore passage 60 leading to the power developing mechanism of the motor.

Provision is made to enable the welder to manually vary the open position of the valve element 58 so as to regulate the flow of fluid to the motor and thus vary its speed and the concomitant feed speed of the welding wire electrode to the work. This is accomplished by providing as a part of the valve structure a projecting stem 61 which extends through the bottom wall 54 to the exterior of the housing where it engages with a valve control lever 62 which extends alongside the exterior of the torch housing in the vicinity of the straight body portion 11. This lever is hinged at its inner end on a pivot 63.

As an added feature, provision is made whereby the fluid flow through the outlet bore passage 60 to the motor may be adjusted to a predetermined set value by means of a needle valve 64 (FIG. 6) carried by an adjusting screw 65 which extends through a suitable opening 66 of the housing to a position where it may be conveniently adjusted, when desired.

The exhaust fluid from the motor passes through an outlet conduit 67 into the air cooling chamber 16 of the head end 15 of the adapter. From this chamber, the air passes outwardly through a discharge conduit 68 to an outlet port 69 from which is issues in the form of a jet stream in a direction as shown by the arrow 70, FIG. 2, which is in angular relation to the longitudinal axis of the straight body portion 11 of the housing structure of the torch. The flow direction of this discharge jet is such that it induces a flow of welding fumes created at the nozzle 13 during welding operations away from the welder so that he does not have to breathe these fumes which in many cases constitutes a health hazard as well as otherwise interfering with the carrying on of the welding operation. As thus arranged, the exhaust fluid from the power means not only serves as a cooling agent for the end of the torch nearest the welding operation, but also serves as a means for deflecting the welding fumes away from the face of the welder.

The remote control unit B, as shown in FIG. 1, may or may not comprise a part of an associated welding machine. This unit as shown usually comprises a housing 71 for the various control instrumentalities including suitable means (not shown) for providing a regulated air pressure source. Also included would be the conventional filter and pressure regulator for connection with a source of inert gas such as argon for use in making welds in certain types of metals. The unit is also shown as including a rotatably mounted spool 72 of the required electrode wire, wire being fed through a wire guide 73 as it is unreeled and delivered to the welding torch fitting 30 through a suitable conduit. Electrical direct current power is supplied to the unit from a suitable source (not shown) which is connected to electrical leads 74. This power source is electrically connected with the torch A where it is applied to the welding wire during its feeding operation. Electric current for welding in this case is conducted to the torch by means of a tubular conduit 75 which performs the dual purpose of conducting the fluid such as air to the torch for the operation of the wire feeding means therein, and also includes a conducting shield of copper, aluminum or other suitable metal which forms an electrical conductive path for current supplied to the electrode wire. This tubular conduit may also be used as a cooler for the air which is being conducted to the torch. As an alternative, it may be desirable to provide a precooling heat exchanger 76 for precooling the motor driving fluid. At the delivery end, the conduit 75 connects with the torch fitting 51.

As further indicated in FIG. 1, the inert gas utilized for shielding the welding arc is conducted to the torch A through a suitable conduit 77 which is connected between the remote control unit and terminal connection 28 at the torch.

For providing the necessary control functions at the remote control unit B, a transformer 78 is provided for reducing the line voltage to a control voltage of the order of 24 volts. The control output voltage of the transformer is conected through an electromagnetic control relay 79 to energizing circuits of solenoid valve 80 for controlling air supply to conduit 75, and solenoid valve 81 for controlling supply of gas to conduit 77.

Provision is made for controlling the operation of the control relay 79 from the welding torch A. For this purpose, and as best shown in FIG. 4, a microswitch 82 is mounted in any suitable manner within the housing structure of the torch, and is shown as being positioned adjacently to the pivot 63 of the valve control lever 62. The microswitch has an actuating member 83 in camming relation with a cam portion 84 integrally formed with and at the pivoted end of the valve control lever 62. The camming edge of the cam 84 which is associated with the actuating member 83 is so arranged that the microswitch will close the energizing circuit of the relay 79 just immediately prior to movement of the valve 58 to the beginning of its open position. Energization of the relay 79 will close its contacts and energize the valves 80 and 81 to connect air and gas to the welding torch. Conversely, as the valve 58 is moved towards closed position, the microswitch will open just immediately after valve 58 closes, and in so doing open the energizing circuit of relay 79 so that it will open its contacts and deenergize the solenoid valves 80 and 81. In this way, the valves 58 and 80 will be similarly operated, and by closing the flow through conduit 75 at its source end as well as the torch connected end, there will be no residual pressure applied to the torch after the valves are closed, and thus overtravel drive of the feed wire will be obviated.

During the time that valve 58 is open, it may be regulated by means of the valve control lever 62 so as to vary the flow of fluid through the motor, thus giving the welder complete control of wire speed and enabling the welder to vary the current flow as desired when used with a constant voltage welding system.

In addition to the speed adjustment control, the needle valve 64 may be adjusted to provide the desired upper speed limit of the wire feed.

The controls of motor fluid at the source and at the welding torch so that they can be turned on and shut off simultaneously provides the best type of operation to prevent overtravel of the wire electrode. However, by making the valve 80 a three-way valve which will connect in its closed position the conduit 75 to a bleed or exhaust outlet, it is possible to accomplish the same purpose and prevent overtravel of the wire electrode. Such an arrangement may also provide excellent operation by utilizing it in connection with the simultaneous operation of the valve 58. The microswitch circuit leads, as indicated at 85 are carried through a flexible cable to the control coil of the relay 79.

From the foregoing description, it is believed that it will be appreciated that the heretofore outlined objects of the invention will be attained, and that the welding torch embodying the described features provides inherent advantages in carrying out a welding operation.

Various modifications may suggest themselves to those skilled in the art without departing from the spirit of my invention, and, hence, I do not wish to be restricted to the specific form shown or uses mentioned, except to the extent indicated in the appended claims.

I claim:
1. An arc welding torch, comprising:
   (a) an elongate tubular housing including a substantially straight hand-grip body portion and a curved extension neck portion at one end of the body;
   (b) a directing nozzle for an inert gas at the outer end of said neck position with its longitudinal axis at an angle to the longitudinal axis of the body portion;
   (c) means in said housing for guiding an electrode wire to said nozzle;
   (d) means in said housing for moving said wire in a feeding direction including a fluid driven motor contained in the hand-grip body portion; and
   (e) a manually operable control carried by the hand-grip body portion including means for continuously variably controlling the amount of fluid delivered to said motor to vary the feeding speed of said wire during the welding operation.

2. In a hand held arc welding torch:
   (a) an elongate tubular housing having a neck extension at one end;
   (b) a directing nozzle for an inert gas at the outer end of said neck;
   (c) means in said housing for guiding an electrode wire to said nozzle and a point of welding in the inert gas environment;
   (d) air operable means in said housing for moving said wire in a feeding direction, said air operable means having an exhaust leading to the exterior of said housing; and
   (e) means for directing said exhaust air from said housing in a direction away from said point of welding and which will move welding fumes in a path away from the face of a welder during use of the torch in a welding operation.

3. In a hand held arc welding torch:
   (a) an elongate tubular housing including a substantially straight hand-grip body portion and a curved extension neck portion at one end of the body;
   (b) a directing nozzle for an inert gas at the outer end of said neck positioned with its longitudinal axis at an angle to the longitudinal axis of the body portion;
   (c) means in said housing for guiding an electrode wire to said nozzle; and
   (d) air power driven means in said housing for moving said wire in a feeding direction during a welding operation, said power means having an exhaust discharge adjacent said nozzle which is directed away from the nozzle and is operative to move welding fumes in a direction away from a welder using said torch.

4. Arc welding apparatus, comprising:
   (a) a welding torch including an elongate tubular housing having a neck extension at one end;
   (b) a directing nozzle for an inert gas at the outer end of said neck;
   (c) means in said housing for guiding an electrode wire to said nozzle;
   (d) means in said housing for moving said wire in a feeding direction including a fluid driven motor having an inlet connection with a pressurized fluid supply source;
(e) a control valve at the source end of said connection having "open" and "closed" positions of operation;
(f) a manually operable valve at the motor inlet end of said connection having "open" and "closed" positions of operation; and
(g) means responsive to the actuation of said manually operable valve at said inlet for causing a corresponding actuation of said valve at said source.

5. Arc welding apparatus comprising:
(a) a welding torch including an elongate tubular housing having a neck extension at one end;
(b) a directing nozzle for an inert gas at the outer end of said neck;
(c) means in said housing for guiding an electrode wire to said nozzle;
(d) means in said housing for moving said wire in a feeding direction including a fluid driven motor having an inlet connection with a pressurized fluid supply source;
(e) an electrically operated control valve at the source end of said connection having "open" and "closed" positions of operation, said valve having an energizing circuit;
(f) a manually operable valve at the motor inlet end of said connection having "open" and "closed" positions of operation;
(g) a lever for controlling the actuation of said manually operable valve; and
(h) switch means controlling said energizing circuit, said switch means being operable by said lever, whereby the actuation of said valves will be coordinated.

6. Arc welding apparatus, comprising:
(a) a welding torch including an elongate tubular housing having a neck extension at one end;
(b) a directing nozzle for an inert gas at the outer end of said neck;
(c) means in said housing for guiding an electrode wire to said nozzle;
(d) means in said housing for moving said wire in a feeding direction including a fluid driven motor having an inlet connection with a pressurized fluid supply source;
(e) an electrically operable control valve at the source end of said connection having "open" and "closed" positions of operation, said valve having an energizing circuit;
(f) manually operable switch means at the motor inlet end of said connection for controlling said energizing circuit; and
(g) means operable simultaneously with the actuation of the valve at said source to "closed" position for discontinuing flow of pressurized fluid to said motor inlet.

7. An arc welding torch, comprising:
(a) an elongate tubular housing having a neck extension at one end;
(b) a directing nozzle for an inert gas at the outer end of said neck;
(c) means in said housing for guiding an electrode wire to said nozzle;
(d) means in said housing for moving said wire in a feeding direction including a fluid driven motor having an inlet adapted for connection with a regulated pressurized fluid supply source; and
(e) manually controlled valve means including a reciprocable spring loaded valve member at said inlet instantly operable at the will of a welding operator during a welding operation to vary the fluid flow to said motor so as to control and regulate the feeding speed of said wire.

8. An arc welding torch, comprising:
(a) an elongate tubular housing having a neck extension at one end;
(b) a directing nozzle for an inert gas at the outer end of said neck;
(c) means in said housing for guiding an electrode wire in a feeding direction to said nozzle;
(d) fluid driven means in said housing for feeding said wire and having an inlet adapted for connection with a regulated pressurized fluid supply source;
(e) an adjustable valve at said inlet for presetting the driving speed of said fluid driven means; and
(f) a manually controlled valve including a reciprocable slide valve member having "closed" and "open" positions, and in the "open" position being instantly variable to regulate the flow of fluid through said adjustable valve.

9. An arc welding torch, comprising:
(a) an elongate tubular housing having a neck extension at one end;
(b) a directing nozzle for an inert gas at the outer end of said neck;
(c) means in said housing for guiding an electrode wire in a feeding direction to said nozzle;
(d) fluid driven means in said housing for feeding said wire and having an inlet adapted for connection with a pressurized fluid supply source;
(e) an adjustable valve at said inlet for presetting the driving speed of said fluid driven means;
(f) manually controlled valve means including a movable actuating lever extending along the outside of said housing for motivating the valve to "opening" and "closing" positions, and in the "open" position being variable to regulate the flow of fluid through said adjustable valve; and
(g) an electric circuit controlling switch operable by said lever at points in the movements of said lever corresponding substantially with the "opening" and "closing" positions of said valve.

10. An arc welding torch, comprising:
(a) an elongate tubular housing including a substantially straight hand-grip body portion for engagement by one hand of a welder and a curved neck extension at one end of the body;
(b) a directing nozzle for an inert gas at the outer end of said neck;
(c) means in said housing for guiding an electrode wire to said nozzle;
(d) fluid driven means in said housing for feeding said wire and having an inlet adapted for connection with a pressurized fluid supply source;
(e) means for controlling and regulating the flow of fluid to said fluid driven means including a reciprocable valve member supported for sliding movement to "closed" and "open" positions, and in the open position being operable to vary the fluid flow;
(f) switch means for controlling an electrical circuit including an actuating member; and
(g) a pivoted lever member extending generally along a side of said body portion having operating connections with said actuating member and said valve member.

11. An arc welding torch according to claim 9, wherein the circuit controlling switch has an actuating member, and the actuating lever includes a cam in camming relation with said actuating member.

12. Arc welding apparatus, comprising:
(a) a welding torch including an elongate tubular housing having a neck extension at one end;
(b) a directing nozzle for an inert gas at the outer end of said neck having an inlet connection with a gas supply source at a remote control station;
(c) means in said housing for guiding an electrode wire to said nozzle, said wire having an energizing connection with a current supply source at said remote control station;

(d) means in said housing for moving said wire in a feeding direction including a fluid driven motor having an inlet connection with a pressurized fluid supply source at said remote control station;
(e) control means at said remote control station including a control device for connecting and disconnecting at least one of said connections with its supply source, said device having an energizing circuit;
(f) a manually operable valve at the motor inlet end of its connection having "open" and "closed" positions of operation; and
(g) switching means responsive to the actuation of said manually operable valve for controlling the energizing circuit of said device.

References Cited by the Examiner
UNITED STATES PATENTS

| | | | |
|---|---|---|---|
| 1,731,502 | 10/1929 | Paterson | 219—130 |
| 2,373,598 | 4/1945 | Reeb | 219—130 |
| 2,376,692 | 5/1945 | Heim | 219—88 |
| 2,719,245 | 9/1955 | Anderson | 219—130 X |
| 2,806,125 | 9/1957 | Miller | 219—130 |
| 2,862,098 | 11/1958 | Hasselhorn | 219—74 |
| 2,900,488 | 8/1959 | Bassot | 219—130 |
| 3,155,811 | 11/1964 | Adamson et al. | 219—130 |

RICHARD M. WOOD, *Primary Examiner.*